US009457995B2

(12) United States Patent
Makovec et al.

(10) Patent No.: US 9,457,995 B2
(45) Date of Patent: Oct. 4, 2016

(54) GUIDE STRIP FOR A GUIDE RAIL OF AN ESCALATOR OR A MOVING WALKWAY

(71) Applicant: Inventio AG, Hergiswil (CH)

(72) Inventors: Christoph Makovec, Wiener Neustadt (AT); Jürg Burri, Hirschthal (CH); Michael Matheisl, Vösendorf (AT); Thomas Illedits, Neufeld (AT); Thomas Novacek, Schwechat (AT); Uwe Hauer, Nienburg (DE); Wolfgang Neszmerak, Vienna (AT)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 14/432,023

(22) PCT Filed: Sep. 18, 2013

(86) PCT No.: PCT/EP2013/069364
§ 371 (c)(1),
(2) Date: Jun. 4, 2015

(87) PCT Pub. No.: WO2014/048808
PCT Pub. Date: Apr. 3, 2014

(65) Prior Publication Data

US 2016/0137460 A1 May 19, 2016

(30) Foreign Application Priority Data

Sep. 27, 2012 (EP) .................................... 12186423

(51) Int. Cl.
*B65G 13/11* (2006.01)
*B65G 43/00* (2006.01)
*B66B 23/14* (2006.01)
*B66B 21/04* (2006.01)
*B66B 21/10* (2006.01)
*B66B 25/00* (2006.01)
*B66B 27/00* (2006.01)

(52) U.S. Cl.
CPC ............... *B66B 23/14* (2013.01); *B66B 21/04* (2013.01); *B66B 21/10* (2013.01); *B66B 25/006* (2013.01); *B66B 27/00* (2013.01)

(58) Field of Classification Search
CPC ............................... B65G 13/11; B65G 43/00
USPC ......................... 198/321, 323, 326, 332, 333
See application file for complete search history.

(56) References Cited

U.S. PATENT DOCUMENTS 2,906,390 A * 9/1959 Hefti ..................... B65G 39/20 104/94
4,629,052 A * 12/1986 Kitamura ............... B66B 29/02 198/323
5,052,539 A * 10/1991 Fillingsness ............ B66B 23/12 198/323

(Continued)

FOREIGN PATENT DOCUMENTS

EP 1 679 280 A1 7/2006
EP 2 050 708 A2 4/2009

(Continued)

*Primary Examiner* — Douglas Hess
(74) *Attorney, Agent, or Firm* — Ladas & Parry LLP

(57) ABSTRACT

Guide rail for an escalator of a moving walkway, comprising at least one planar base surface with a guide surface for rollers, particularly for guide rollers of a step belt or plate belt of an escalator or a moving walkway, and at least one guide strip with a guide flank for lateral guidance of these rollers, wherein the guide strip is a separate component.

19 Claims, 5 Drawing Sheets

(56) References Cited

U.S. PATENT DOCUMENTS 5,819,902 A * 10/1998 Schoneweiss ........ B66B 29/005 198/323
5,881,859 A * 3/1999 Bianchi ................... B66B 23/04 198/335
6,490,979 B1 * 12/2002 Pfleger ................... B65G 19/02 104/128
6,644,210 B1 * 11/2003 Pfleger .................. B66B 31/006 104/128
7,453,358 B2 * 11/2008 Webster ................. B65G 19/02 104/172.3
8,328,003 B2 * 12/2012 Webster ................ B66B 31/006 104/172.3
2005/0023107 A1 * 2/2005 Matheisl

FOREIGN PATENT DOCUMENTS

JP S58 117464 U 8/1983
JP S58 134367 U 9/1983

* cited by examiner

GUIDE STRIP FOR A GUIDE RAIL OF AN ESCALATOR OR A MOVING WALKWAY

RELATED APPLICATION INFORMATION

This application is a 371 of International Application PCT/EP2013/069364 filed 18 Sep. 2013 which claims priority from EP Patent Application No. 12186423.5 filed 27 Sep. 2012, the content of which incorporated herein by reference.

The present invention relates to a guide rail for an escalator or a moving walkway.

Escalators and moving walkways which have a support structure are known from the prior art. Guide rails are arranged in the support structure between a first deflecting region and a second deflecting region.

EP 1 679 280 A1 shows, by way of example, a guide rail with a complex profile, which can be fastened on a support. The guide rail is of integral construction and has a protruding integrally formed web with a guide flank, which laterally guides the rollers of a step belt of an escalator or the rollers of a plate belt of a moving walkway.

EP 2 050 708 A2 similarly shows a guide rail for escalators and/or moving walkways. This guide rail also has a complex profile, which has suitable shoulders in order to laterally guide the rollers of a step belt of an escalator or the rollers of a plate belt of a moving walkway.

The production of such guide rails with integrated guide flanks is complicated and costly. Due to the production, certain limits are placed on the shaping. Moreover, integrally formed guide flanks have a radius in the transition to the guide surface of the guide rail, on which guide surfaces the rollers run in the movement direction. This radius can significantly damage the edge of the rollers or causing excessive wear.

It is the object of the invention to overcome the disadvantages of the prior art. In particular, a guide rail for an escalator or a moving walkway shall be made available which is economic to produce and allows guidance of guide rollers in a preserving manner.

This object is fulfilled by the devices defined in the independent patent claims. Further forms of embodiment are evident from the dependent patent claims.

An escalator with a step belt or a moving walkway with a plate belt has a first deflecting region and a second deflecting region, wherein the plate belt or the step belt is arranged to circulate between the first deflecting region and the second deflecting region. In addition, the escalator or the moving walkway includes at least one guide rail, which is arranged between the deflecting regions, for guidance of the step belt or plate belt. The guide rail has at least one base surface with a guide surface for rollers of the step belt or plate belt. Moreover, the escalator or the moving walkway comprises at least one guide strip with a guide flank for lateral guidance of these rollers, wherein the rollers during guidance are in lateral contact with the guide flank. The guide strip is a separate component and during installation the position of the guide strip relative to the guide rail is thereby selectable.

In the present specification all immovable parts of the escalator or moving walkway which support the rollers of the step belt or plate belt between the two deflecting regions against gravitational force and on the guide surfaces of which the rollers roll, or parts which prevent the rollers from lifting off the guide surfaces, are denoted by “guide rail”. That can thus be guide rails, guide tracks, counter-guide rails and the like. The “rollers” are, for example, guide rollers or chain rollers of a step belt or a plate belt. Due to the fact that the guide strip is constructed as a separate component this can be easily produced, mounted and adjusted.

The plate belt or step belt usually includes a plurality of plates or steps, which are arranged between two roller chains. The rollers of the roller chains are supported on the guide rails and usually run straight without problems. With increasing running power the chain joints, chain pins and the bearing bushes in the roller chains are worn and differing elongations between the lefthand roller chain and the right-hand roller chain can occur. These minimal differences are sufficient for the plates arranged between the roller chains to no longer be arranged entirely orthogonally to the direction of movement and as a result running to the side occurs. This running to the side or skewed running results in a side force which lets the rollers depart from the theoretical direction of movement thereof. Since the rollers come into contact with the guide strip only when this running to the side occurs it is important that the rollers during guidance are in direct contact with the guide flank of the guide strip. Due to this direct contact a service operative can without problems hear and also detect by touch that the rollers contact the guide flank and are guided by this. The service operative can then undertake selective maintenance operations.

Through the separation of guide rail and guide strip it is possible to select, for the guide strip, production methods which differ from the production method of the rest of the guide rail. Moreover, embodiments can be constructed which cannot be realised or can be realised only with considerable complication in the case of a one-piece production method. In particular, such guide strips have no radius in the transition region between guide surface and guide flank. It is even conceivable for the guide strips to be constructed in such a manner that the guide flank does not extend entirely up to the base surface, but at least in the region of the guide flank there is a spacing between the guide flank and base surface or guide surface. Moreover, there are no restrictions in the selection of material for the guide strips. Such guide strips are preferably made of one of the following materials or alloys: steel, steel alloys, aluminium, aluminium alloys, brass, bronze, bronze alloys, polymer materials, glassfibre-reinforced polymer materials, and the like. The use of polymer materials for production of guide strips is particularly advantageous when the hardness thereof is less than the hardness of the rollers so that when contact occurs there is wear of the guide strip and not of the roller. The advantage resides in the fact that the guide strips can be exchanged substantially more easily than the rollers.

However, in the case of special fields of use superordinate demands can have the consequence that the material of the guide strip has to be harder than the material of the roller. Such special fields of use can be escalators and moving walkways of extra length, which are arranged, for example, in subway stations, in airport buildings or in installation situations difficult of access for maintenance personnel.

A guide strip can be arranged on the guide rail in sections. For example, it is conceivable that in the direction of movement after a guide strip the rollers move on the guide rail unguided over a short path. Only after a certain spacing, for example, does a further guide strip follow. It will be obvious that in the case of such a section-wise arrangement of guide strips a further cost saving by comparison with a guide rail, which is known from EP 1 679 280 A1, with an integrally formed continuous guide flank results. The wear of the side edge of the guide rollers can be similarly substantially reduced by such a section-wise arrangement.

The guide strip can be arranged on the base surface near the actual guide surface of the rollers or the guide rail. For example, a detachable connection or arrangement is conceivable. Through the direct mounting of the guide strip on the base surface of the guide rail it is made possible to reduce the constructional height of the guide rail. There are no minimum constructional heights predetermined by production circumstances.

Through a detachable arrangement of the guide strip it is simple to replace the guide strip in the case of excessive wear or in the case of damage of the guide strip.

The guide rail can have at least one further base surface with a guide surface which is arranged below the first guide surface, wherein the guide surface arranged on the first base surface is provided for a forward run of the rollers of the step belt or plate belt and the further guide surface is provided for a return run of the rollers of the step belt or plate belt. Through the use of a separate component as guide strip it is possible for the guide rail be designed as, for example, a simple U-section or C-section. For example, the guide surface for the forward run is disposed on the upper limb of the C-section whilst the guide surface for the return run is arranged on the lower limb of the C-section. One or more guide strips can be arranged not only on the base surface for the forward run, but also on the base surface for the return run.

The guide strips for the forward run of the rollers can be arranged to be offset in movement direction with respect to the guide strips of the return run. Through an offset arrangement of the guide strips the guide rail is loaded less with side forces resulting from running steps or plates not oriented entirely orthogonally to the direction of movement.

The guide rail and/or the guide strip can comprise fastening means which are designed in such a manner that a lateral setting of a position of the guide strip transversely to the direction of movement of the rollers is possible. Thus, for example, the useful service life of the guide strip is extended. If, for example, the guide flank is worn, the guide strip can be laterally adjusted or readjusted so as to not permit an excessive play between the guide strips and the rollers of a step or plate. Moreover, a simpler initial mounting of the guide rail is made possible. The lateral play can be set at the time of installation on site and thus dependent on the plant.

The guide rail can have one or more guide strips in the forward run and/or return run. Thus, notwithstanding a section-wise guidance a smooth running of the escalator or moving walkway can be guaranteed since a lateral deflection of the step belt or plate belt can be caught and corrected in good time.

At least one guide strip can comprise a sensor for measuring or detecting side forces acting on the guide strip. Such a sensor can be, for example, a strain-gauge measuring bridge (SG) or a switch. Obviously, other embodiments of sensors such as radar sensors, optical sensors of all kinds, ultrasonic sensors, GSM antenna modules used as sensors and the like are also conceivable. The use of sensors makes it possible, for example, to issue a warning report and/or stop the plant in the case of excessive loading of the guide strip. The sensor can be designed for detection of impacting rollers or for measurement of side forces, a temperature or a speed or for measuring vibrations and oscillations. Obviously also other measuring systems or sensor are conceivable, which can also record different operating conditions.

At least one guide strip equipped with a sensor can be arranged to displaced with respect to the remaining guide strips laterally in direction towards the guide surface of the rollers, thus to protrude with respect to the remaining guide strips in the direction of the rollers. Such a guide strip then no longer serves primarily only for lateral guidance or lateral conducting of the rollers, but shall measure the effective side force in good time. This guide strip with sensor can thus be used as an early warning system for lateral positional determination of the step belt in the escalator or of the plate belt in the moving walkway.

A flank angle between the guide flank and the guide surface can lie between 90° and 140°, preferably between 90° and 135°, particularly preferably between 90° and 125°.

A guide strip according to the invention for a guide rail serves, as outlined in the foregoing, for lateral guidance of rollers, particularly of guide rollers of a step belt or plate belt. The guide strip has a guide flank with a flank angle and is constructed as a component separate from the guide rail. Through the separate construction it is made possible for the guide strip and/or a guide rail to be produced and manufactured particularly simply.

The guide strip is essentially an elongate component extending in the direction of movement of the step belt or plate belt. Thus, for example, the guide strip can be a rod, which is arranged parallel to the guide rail, with trapezium-shaped, rectangular, square or round cross-section. Other forms of construction are obviously also conceivable, for example guide strips made from section rods or section tubes.

The guide strip can comprise fastening means for fastening to a guide rail. The fastening means are preferably constructed in such a manner that the guide strip can be adjusted in its lateral orientation transversely with respect to a direction of movement of the rollers to be guided. For example, there can be concerned in that case a slot opening which is formed orthogonally to the theoretical direction of movement and via which the guide strip can be fastened by means of a screw on a guide rail or on fastening means associated with the guide rail.

The guide flank can have in at least one end region of the guide strip in the direction of movement a convex curvature and/or an entry angle between 1° and 45°, preferably between 5° and 35°, particularly preferably between 10° and 25°. By “entry angle” there is understood in that case an angle between an ideal direction of movement of the rollers (theoretical direction of movement) and a straight line in the guide flank in the end region in the plane of the base surface.

Such a curved or angled end region allows simple interception or vectoring and alignment of rollers if these depart from their optimal running track due to running to the side. The two end regions of the guide flank are preferably provided with such curvatures or entry angles so that independently of the direction of movement forwardly or rearwardly the rollers can be vectored and oriented. However, it is also conceivable for the guide strip to have merely one such end region. For example, the guide strips can also be formed to be completely straight, but to be arranged at an angle in correspondence with the entry angle with respect to the direction of movement. Although operation of an escalator or a moving walkway is, in fact, possible in only one direction, the guide strips for that purpose are correspondingly simple to produce.

A sensor, for example a strain-gauge measuring bridge, a radar sensor, a GSM antenna serving as a sensor or a switch or button for detection of impact forces or side forces acting on the guide flank can be arranged at the guide strip. Due to the fact that the guide strip is equipped with a sensor it is possible, for example, to react to excessive side forces by generation and transmission of an error report. However, the sensor can also be constructed for scanning or measuring other operating variables such as, for example, the temperature of the rollers, the speed thereof, oscillations and vibrations and the like.

The sensor can be arranged in a region between two fastening means. It will be obvious that the sensor is preferably arranged on the side of the guide strip averted from the guide flank.

A further aspect of the present invention is the use of a guide rail as previously described and/or a guide strip as previously described for the guidance of rollers, wherein a guide strip is equipped with a sensor. A variable, for example a force or a spacing dimension, measured by the sensor is used for generating maintenance reports. For example, such a variable or value can be recorded and further processed by a signal processing unit. It is conceivable that automatic status or maintenance reports are sent or the operation is set. Possible maintenance reports are, for example:

- in the case of a small measured side force: checking of the plant and possible performance of smaller setting operations or maintenance operations by the service operative is necessary within two weeks,
- in the case of a medium side force: checking of the plant by the service operative with setting of the chain tension or replacement of the roller chain is necessary within 24 hours and only restricted travel operation remains possible,
- in the case of high measured side force: operation of the plant is interrupted for safety reasons until checking or maintenance is carried out by the service operative.

In that case the values "small", "medium" and "high" are usually predetermined values, variables and measurements which are confined not only to the side force. Equally, similar status or maintenance reports are also conceivable when specific operating temperatures or operating speeds are reached or when predetermined vibration values arise.

The guide strip can, as explained further above, comprise at least one sensor for detecting or measuring at least one measurement variable. This measurement variable can be the solid-borne sound of the step belt or plate belt, oscillations, lining thickness of rollers, thickness of dirt adhering to the guide track and/or the rollers or the position of a ball-bearing ring of a roller relative to its roller axis.

The invention is explained in more detail in the following by way of figures, which illustrate merely embodiments and in which.

Figure 1:
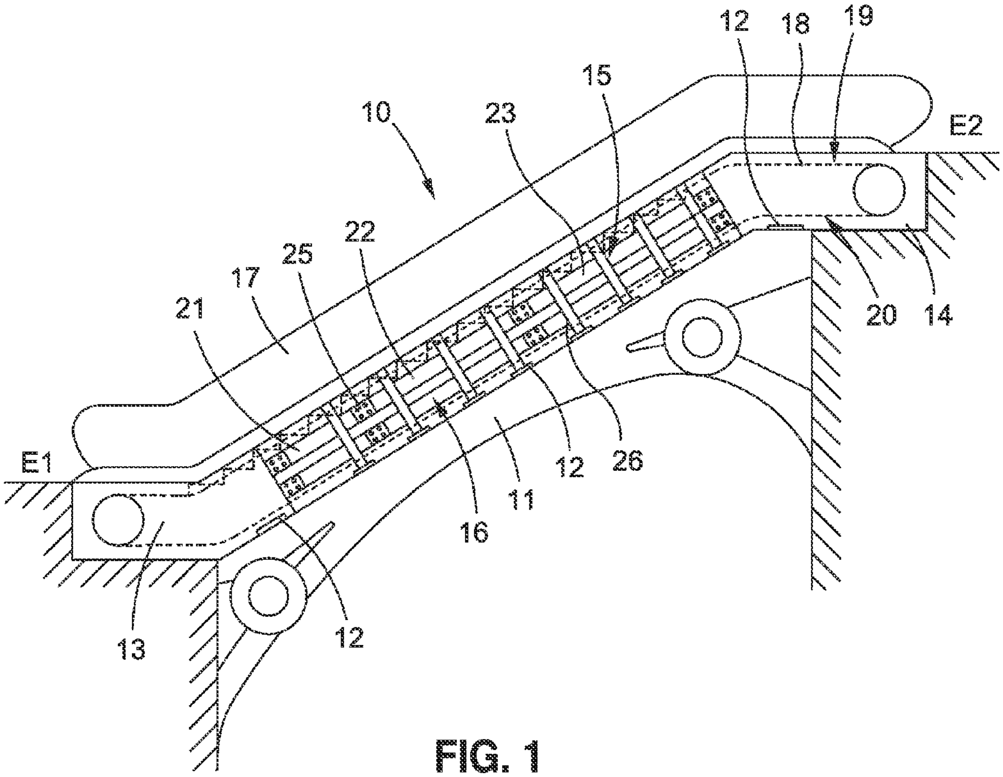
FIG. 1 shows, in side view in schematic illustration, an escalator which is arranged on a supporting structure and which comprises support structures, guide rails, balustrades and an encircling step belt, these being arranged between a first deflecting region and a second deflecting region.

FIG. 1 shows, in schematic illustration in side view, an escalator 10 which is arranged on a supporting structure 11 and which connects a lower plane E1 with an upper plane E2. The supporting structure 11 is, by way of example, designed in the style of an old bridge so as to clearly show that the supporting structure 11 can be left to the design freedom of the architect. The supporting structure 11 can obviously also be a concrete staircase, a framework or two I-beams. The supporting structure 11 has to fulfil specific conditions with respect to the stiffness and load-bearing capability thereof, which the manufacturer of the escalator or the moving walkway prescribes for the architect.

Mounts 12, on which the parts of the escalator 10 are mounted, are to be provided or subsequently mounted on this supporting structure 11 to be set up at the construction location. For the sake of better overview only three mounts 12 are provided with reference numerals, although in the present example a mount 12 is present for each support structure. The mounts can be simple mounting plates which are, for example, directly connected with a reinforcement of the supporting structure. Obviously other suitable mounts 12 such as concrete anchors, threaded rods, weld plates, screw-holes and the like are also usable.

The escalator 10 comprises a first deflecting region 13 and a second deflecting region 14 as well as support structures 15, guide rails 16, balustrades 17 and an encircling step belt 18, which are arranged between the deflecting regions 13, 14. Due to the overview, only one support structure 15 is provided with a reference numeral. The step belt 18 is deflected in the upper plane E2 and in the lower plane E1 and thus has a step belt forward run 19 and a step belt return run 20. For the sake of better clarity a detailed illustration of the step belt 18 was dispensed with.

Figure 2:
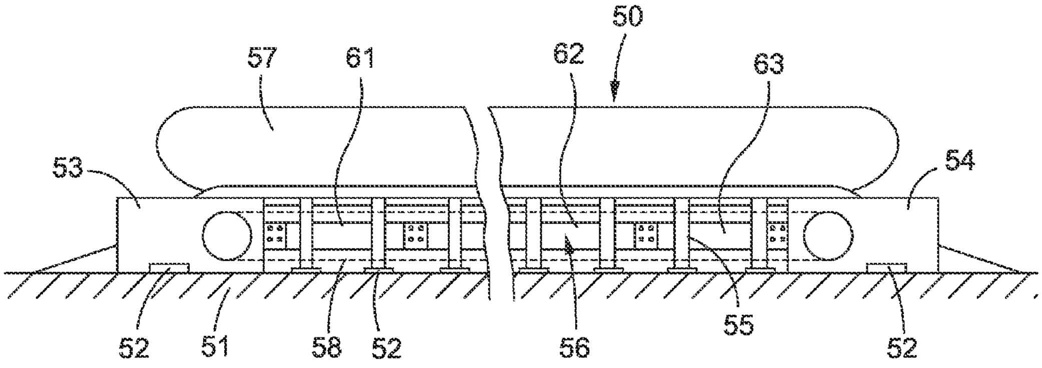
FIG. 2 shows, in side view in schematic illustration, a moving walkway which is arranged on a supporting structure and which comprises support structures, guide rails, balustrades and an encircling plate belt, these being arranged between a first deflecting region and a second deflecting region.

It is clearly evident from FIG. 1 that the guide rails 16 are subdivided into guide rail sections 21, 22 and 23 and screw-connected together by means of connecting plates 25. The guide rail sections 21, 22 and 23 preferably have the same length, but, as evident in FIG. 1, they can also have different lengths. The guide rails are supported on the supporting structure 11 by a plurality of support structures 15. Of the support structures 15 merely the supports 26 oriented towards the viewing plane are visible, for which reason the support structures 15 are explained in more detail only further below in the description of FIG. 3. There, in fact, support structures of the moving walkway illustrated in FIG. 2 are described, but the construction and function of the support structures 15 of the escalator 10 correspond with the support structures shown and described in FIG. 3. Each of the supports 26 has a foot fastening region which, as illustrated, is rigidly connected with the associated mount 12 of the supporting structure 11.

FIG. 2 shows, in side view in schematic illustration, a moving walkway 50, which is arranged on a supporting structure 51. Serving as supporting structure 51 is a floor or concrete foundation, which has a sufficient strength. The moving walkway 50 can obviously also be mounted on one of the supporting structures as explained in the description with respect to FIG. 1. The floor also has mounts 52 to which the components of the moving walkway 50 are fastened. Belonging to these components are a first deflecting region 53 and a second deflecting region 54 as well as support structures 55, guide rails 56, balustrades 57 and an encircling plate belt 58, which are arranged between the deflecting regions 53, 54. The construction of the moving walkway 50 thus substantially corresponds with the construction of the escalator 10 described in FIG. 1 even if in the present embodiments of FIGS. 1 and 2 two guide rails 26 are illustrated arranged one above the other in the case of the escalator 10 and only one guide rail 56 in the case of the moving walkway 50.

The guide rails 56, which are illustrated in FIG. 2, of the moving walkway 50 are also subdivided into guide rail sections 61, 62 and 63 and are supported by the support structures 55, the foot fastening regions of which are fastened to the mounts 52. If the individual guide rail sections 61, 62 and 63 and the support structures 55 associated therewith are already joined together at the manufacturing works to form track modules the transport by the manufacturer to the place of installation and the mounting of the moving walkway 50 or of the escalator 10 on the supporting structure 11, 51 already provided at the place of installation can be substantially simplified.

Figure 3:
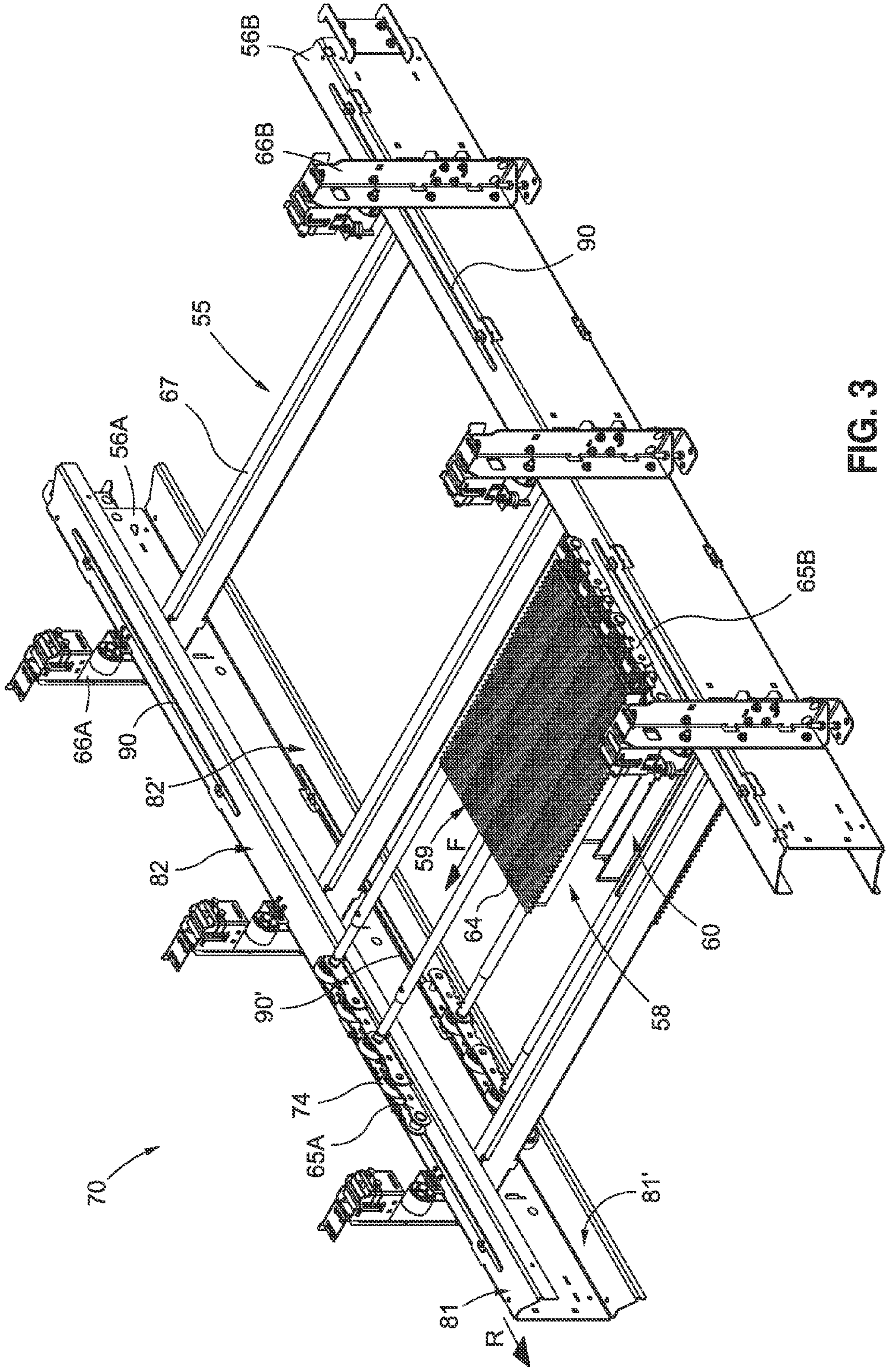
FIG. 3 shows a three-dimensional view of a track module of the moving walkway of FIG. 2, formed from guide rails and support structures.

FIG. 3 shows, in three-dimensional view, a track module 70 of the moving walkway 50 of FIG. 2, formed from three support structures 55 and two guide rails 56A, 56B or guide rail sections arranged opposite one another. Only a smaller part of the plate belt 58, namely a plate belt section 59 of the plate belt forward run and a plate belt section 60 of the plate belt return run, is illustrated on the guide rails 56A, 56B so as to show the function of the guide rails 56A, 56B. The individual plates 64 of the plate belt 58 are in addition illustrated only in a half so as to show the two roller chains 65A, 65B and the rollers 74 thereof on both sides of the plate belt 58. The support structures 55 each comprise two supports 66A, 66B which are rigidly connected together by a transverse strut 67.

The guide rails 56A, 56B are constructed as C-sections. In that case the two limbs of the C-section each have a respective base surface 81 or 81', on which a guide surface 82 or 82' for the rollers 74, particularly guide rollers such as step rollers, plate rollers or chain rollers of a step belt or plate belt, run. In that case the base surface 81 is arranged on the upper limb of the guide rail 56A, 56B and the further base surface 81' on the lower limb of the guide rail 56A, 56B.

The plate belt 58, the rollers 74 of which are supported on the guide rails 56A, 56B, usually runs straight without problems. With increasing running power the chain joints, chain pins and bearing bushes in the roller chains 65A, 65B are worn and different elongations between the lefthand roller chain 65A and the righthand roller chain 65B can arise. These minimum differences are sufficient for the plates 64, which are arranged between the roller chains 65A, 65B, to no longer be arranged entirely orthogonally to the direction R of movement and as a result running to the side occurs. This running to the side or skewed running results in a lateral force F which lets the rollers 74 depart from the theoretical direction R of movement thereof.

In order in this case to guide the rollers 74 on the guide rail 56A, 56B or on the corresponding guide surfaces 82, 82' mutually spaced guide strips 90, 90' are arranged in the direction R of movement and thus in the length direction of the moving walkway or escalator on the base surface 81, 81'. The guide strips 90, 90' have guide flanks 97 (see FIG. 5) which guide the rollers 74 of the plate belt 58 on the guide rails 56A, 56B. The guide strips 90, 90' in that case accept the lateral force F.

Figure 4:
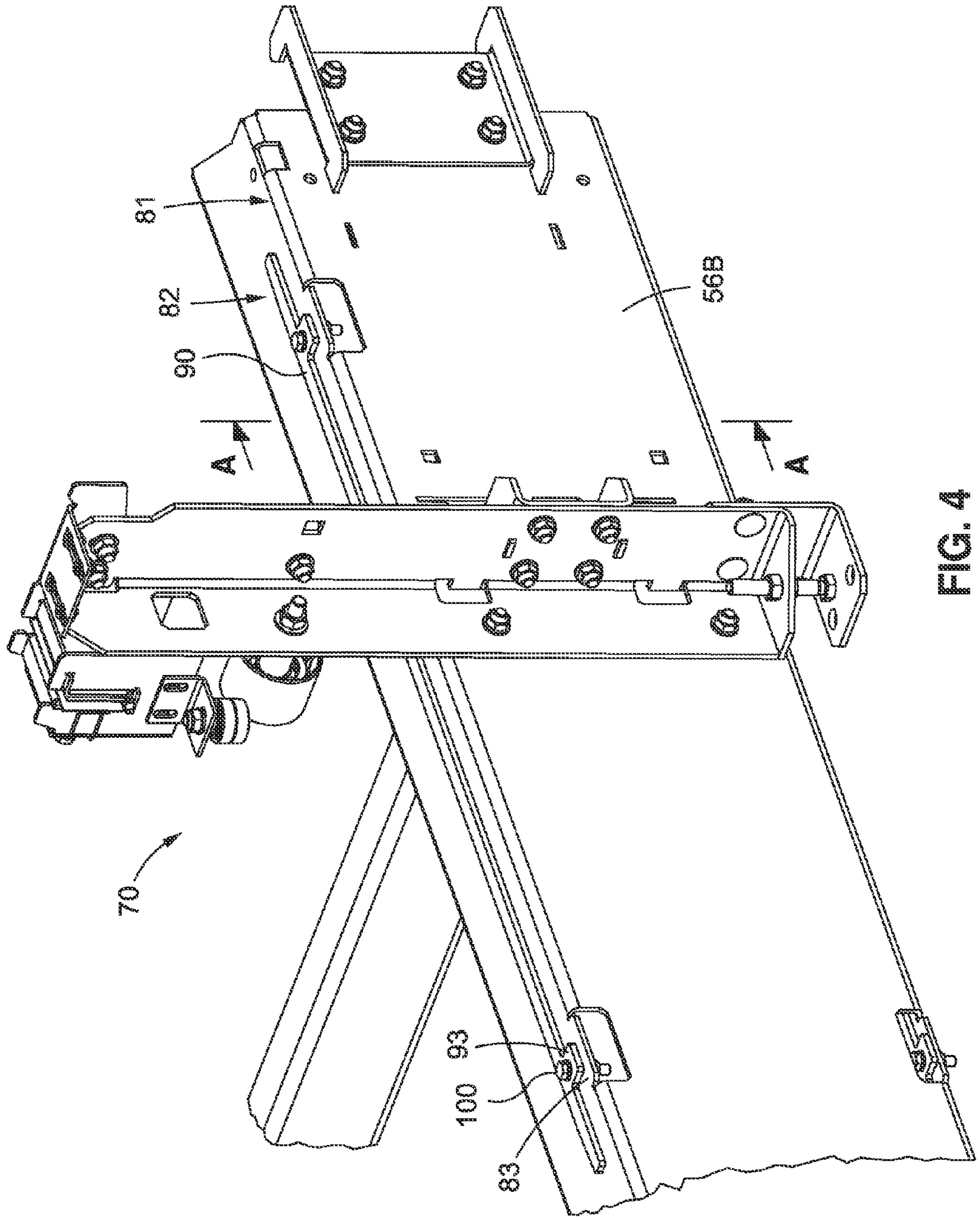
FIG. 4 shows an enlarged view of a sub-region of the track module according to FIG. 3.

An enlarged view of a sub-region of the track module 70 shown in FIG. 3 is illustrated in FIG. 4. One of the guide rails 56B with its upper base surface 81 can be seen. Formed on the base surface 81 are fastening means 83, with the help of which a guide strip 90, which has corresponding fastening means 93, can be arranged on the base surface 81. The guide strip 90 thus laterally bounds the guide surface 82 of the rollers 74 (see FIG. 3) of a plate belt or step belt.

As already mentioned , the guide rail 56B is formed as a C-section. For example, the guide rail 56B can be produced by a simple sheet-metal bending process. The fastening means 83 of the guide rail 56B can in that case be cut out prior to the bending and after the bending protrude in the plane of the base surface 81 above the guide rail 56B. The guide strips 90 are fastened on the base surface 81 by means of a screw-and-nut connection 100. Other forms of connection are equally conceivable, for example by riveting, clinching, welding, soldering, gluing, pinning and the like.

Figure 5:
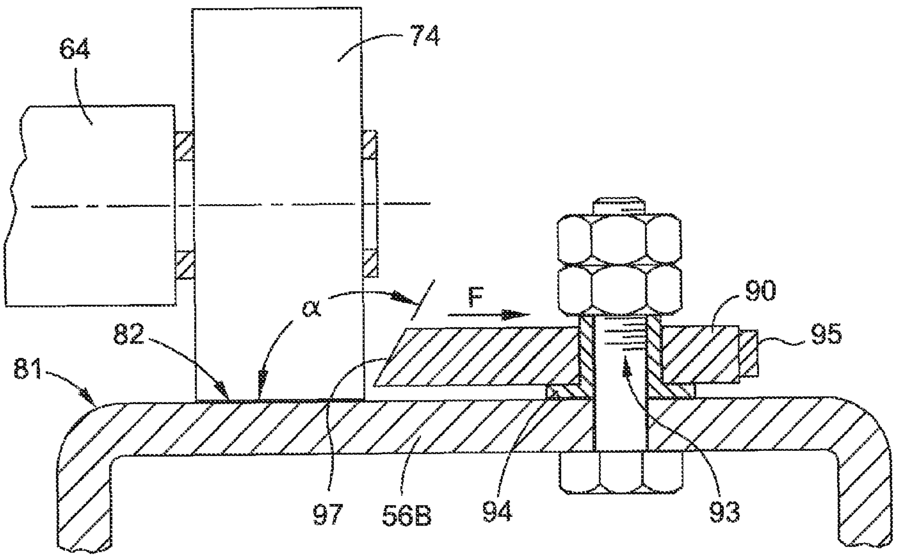
FIG. 5 shows the cross-section of a guide rail and a guide strip in the section plane A-A indicated in FIG. 4.

FIG. 5 shows the cross-section of the guide rail 56B with the base surface 81 in the section plane A-A indicated in FIG. 4. Similarly illustrated is a roller 74 of a plate 64 of the plate belt 58 (see FIG. 3), which rolls on the guide surface 82 during travel operation. The guide strip 90 has a guide flank 97 facing the roller 74. This guide flank 97 has a guide angle $\alpha$ which is preferably 95°. The guide strip 90 has, as fastening means 93, a bore in which a bearing sleeve 94 is arranged. The bearing sleeve 94 comprises a collar so that the guide strip 90 can be fastened without this resting over its entire underside on the base surface 81. This allows a simple, lateral deflection or bending without substantial friction forces between the base surface 81 and the surface, which faces it, of the guide strip 90 transversely to the direction R of movement (see FIG. 3) of the rollers 74 when a lateral force F acts on the guide strip 90. The guide strip 90 is equipped with a sensor 95. This sensor 95 is arranged on a side opposite the guide flank 97, for example in the form of a strain-gauge measuring bridge.

Due to the elongate extent of the guide strip 90, which is fastened at both ends, the sensor 95 is arranged between the two fastening means 93 so that a deflection or bending of the guide strip 90 in the case of action of force by the lateral force F can be detected. For preference the guide strips 90 without sensor 95 are also fastened without bearing sleeve 94 to the guide rail 56B, so that the mutually facing surfaces of the guide rail 56B and the guide strips 90 lie against one another and impart to the guide strip 90 a higher degree of stiffness transversely to the direction of movement of the rollers 74. The guide strip 90 can obviously also have more than two fastening means 93 if no deflection or a smallest possible deflection of the guide strip centre is required.

Figure 6:
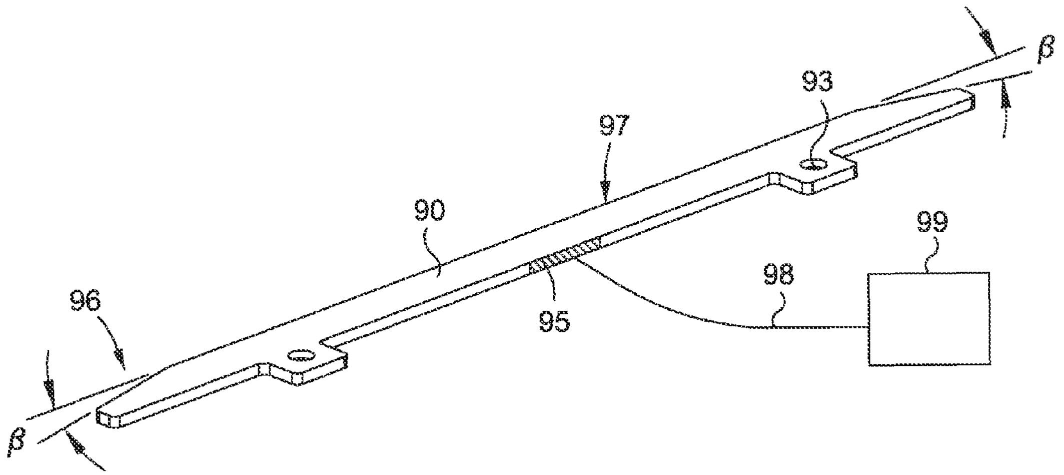
FIG. 6 shows a three-dimensional view of a guide strip.

FIG. 6 shows a three-dimensional view of a guide strip 90. The elongate construction of the guide strip 90 can be clearly seen. In addition, there can be seen in the end region 96 of the guide flank 97 thereof an entry angle p which ensures that rollers 74 (see FIG. 3), which are spaced from the ideal line of the guide surface, are caught again and guided or conducted along the guide flank 97. Also to be seen are two bores in the guide strip 90, which serve as fastening means 93 for fastening the guide strip 90 on a guide rail 56A, 56B, for example by a screw-and-nut connection 100 (see FIGS. 3 and 4).

A sensor 95 in the form of a strain-gauge measuring bridge is arranged at the guide strip on the side averted from the guide flank 97. Obviously other sensors 95, which can detect a force acting on the guide strip 90 or also the resilient deformation or displacement thereof relative to the guide rail 56B, are also usable. The measurement signal of the sensor 95 is transmitted by way of a measurement line 98 to a signal processing unit 99 or the measurement signal is periodically interrogated at the sensor 95 by the signal processing unit 99. The signal processing unit 99 processes the measurement signal and makes available data representing the state of the escalator or the moving walkway in the region of the sensor 95. From this data, actions such as an emergency stop, a maintenance report, a calculation of the remaining service life of the plate belt or step belt and the like can be generated. In addition, the data can be provided with a date and stored chronologically. The evaluation of the thus-created history can supply valuable information, for example for structure modifications.

Figure 7:
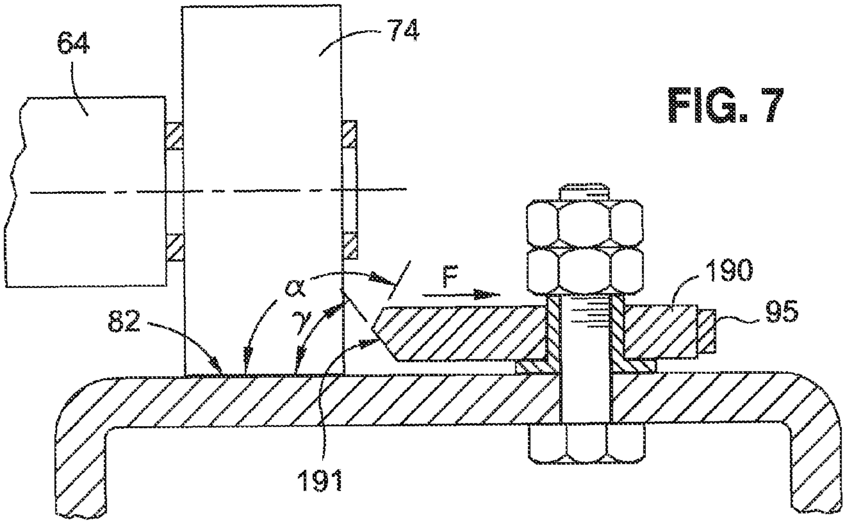
FIG. 7 shows a cross-section of a guide rail and a guide strip in a second embodiment analogous to the section A-A illustrated in FIG. 5.
Figure 8:
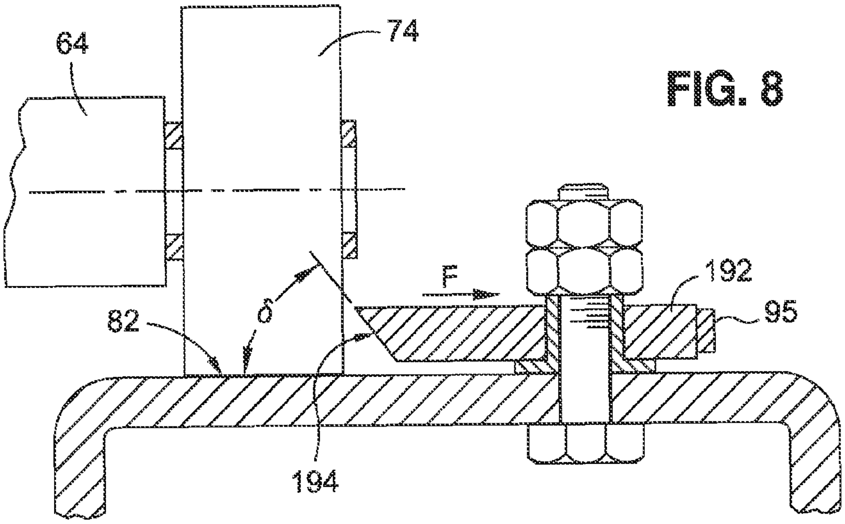
FIG. 8 shows a cross-section of a guide rail and a guide strip in a third embodiment analogous to the section A-A illustrated in FIG. 5.
Figure 9:
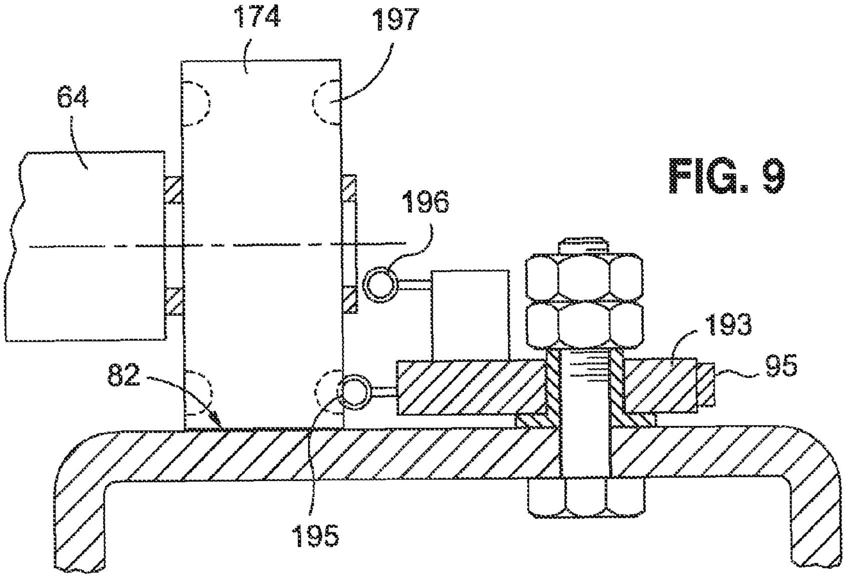
FIG. 9 shows a cross-section of a guide rail and a guide strip in a fourth embodiment analogous to the section A-A illustrated in FIG. 5.

FIGS. 7, 8 and 9 show substantially the same section A-A of FIG. 5 again. The sole difference in relation to FIG. 5 lies in the differently designed guide strips 190, 192 and 193, for which reason the components, which are identical in FIGS. 5, 7, 8 and 9, such as the plates 64, guide track 82 and sensor 95 have the same reference numerals. These are also not further described in detail.

FIG. 7 shows a second embodiment of a guide strip 190 with a sensor 95. A guide flank 191, which is oriented towards the roller 74, of the guide strip 190 has a first flank angle $\alpha>90°$ and a second flank angle $\gamma<90°$ so that an obtuse guide edge directed towards the roller 74 is present. This embodiment is particularly suitable for measuring the state of roller linings. If the roller 74, which usually consists of a roller base body and a lining collar, begins to break up due to wear it is possible for regions of the lining collar to protrude unequally at the circumference. These unequally protruding, rotating regions exert a pulsating force on the guide strip 190, whereby the sensor 95 detects a waveform course of force. This course of force can then be regarded as an indication of progressing destruction of the lining collar of the roller 74.

The third embodiment, which is illustrated in FIG. 8, of a guide strip 192 with a sensor 95 is particularly suitable for monitoring the bearing shells of rollers 74. In order to detect a specific diametral region of the roller 74, in which the bearing (not illustrated) thereof is arranged, the guide strip 192 has a guide flank 194, of which the flank angle $\delta<90°$. The guide flank 192 thus similarly has a guide edge oriented towards the roller 47. As soon as a bearing shell of a roller 74 protrudes this presses against this guide edge and exerts a force on the sensor 95.

FIG. 9 shows a fourth embodiment of a guide strip 193 with a first sensor 95 and with a second sensor 196. The first sensor 95, when each roller 174 moves past, engages by means of a scanning finger 195 in an annular recess 197 of the roller 174. In the normal state each roller thus generates a signal with two peaks. If now the diameter of the roller 174 is smaller due to wear phenomena the annular recess 197 sinks relative to the scanning finger 195 so that the hub of the roller 174 generates a third peak. If, however, through excessive dirt deposits between the guide track 82 and the roller 174 a load-bearing coating arises on the guide track 82 the roller 174 is lifted off the guide track 82 so that the scanning finger 195 can no longer enter into the annular recess 197. As a result, when the roller 174 passes, the scanning finger 195 stands only against the lining thereof and the first sensor 95 detects only one peak.

The second sensor 196 serves for detection of the solid-borne sound or of oscillations at the plate chain axle which connects the plate 64 with the roller 174.

Although the invention has been described in detail on the basis of a track module of a moving walkway it is obvious that a track module of an escalator can also be constructed in the same manner. For example, use can be made of several guide strips with differently constructed guide flanks and sensor arrangements. In addition, the guide track of the plate belt or step belt forward run can be formed in a first guide rail and the guide track of the plate belt or step belt return run can be formed in a second guide rail.

The invention claimed is:

1. An escalator (10) comprising a step belt (18) or moving walkway (50) comprising a plate belt (58), with a first deflecting region (13, 53) and with a second deflecting region (14, 54), wherein the plate belt (58) or the step belt (18) is arranged to circulate between the first deflecting region (13, 53) and the second deflecting region (14, 54) and in addition the escalator (10) or the moving walkway (50) includes at least one guide rail (16, 56, 56A, 56B), which is arranged between the deflecting regions (13, 14, 53, 54), for guidance of the step belt (18) or plate belt (58) and the guide rail (56A, 56B) has at least one base surface (81) with a guide surface (82) for rollers (74) of the step belt (18) or plate belt (58), wherein the escalator (10) or the moving walkway (50) comprises a guide strip (90, 90') with a guide flank (97) for lateral guidance of these rollers (74), wherein the rollers (74) during guidance are in lateral contact with the guide flank (97), and wherein the guide strip (90, 90') is a separate component and during installation the position of the guide strip (90, 90') relative to the guide rail (56A, 56B) is selectable, the guide strip (90, 90') being arranged on the guide rail (56A, 56B) section-wise and comprising a sensor (95) for detecting or measuring lateral forces acting on the guide strip.

2. An escalator (10) or moving walkway (50) according to claim 1, wherein the guide strip (90) is detachably arranged on the base surface (81) near the guide surface (82) of the guide rail (56A, 56B).

3. An escalator (10) or moving walkway (50) according to claim 1, wherein the guide rail (56A, 56B) comprises at least one further base surface (81') with a further guide surface (82') which is arranged below the base surface (810) and the guide surface (82) is designed for a forward run (19, 59) of the rollers (74) of the step belt (18) or plate belt (58) and the further guide surface (82') is designed for a return run (20, 60) of the rollers (74), at least one guide strip being arranged on at least one of the base surface for the forward run and the base surface for the return run.

4. An escalator (10) or moving walkway (50) according to claim 3, wherein the guide strips (90, 90') for the forward run (19, 59) of the rollers (74) are arranged to be offset in movement direction (R) with respect to the guide strips (90') of the return run (20, 60).

5. An escalator (10) or moving walkway (50) according to claim 3, wherein the guide rail (56A, 56B) has a plurality of guide strips (90, 90') in at least one of the forward run (19, 59) and the return run (20, 60).

6. An escalator (10) or moving walkway (50) according to claim 1, wherein at least one of the guide rail (56A, 56B) and the guide strip (90, 90') has fastening means (13, 100) which enable lateral setting of a position of the guide strip (90, 90') transversely with respect to a direction (R) of movement of the rollers (74).

7. An escalator (10) or moving walkway (50) according to claim 1, wherein a flank angle ($\alpha$) between the guide flank (97) and the guide surface (82, 82') lies between 90° and 140°.

8. An escalator (10) or moving walkway (50) according to claim 7, wherein the flank angle lies between 90° and 135°.

9. An escalator (10) or moving walkway (50) according to claim 7, wherein the flank angle lies between 90° and 125°.

10. An escalator (10) or moving walkway (50) according to claim 1, wherein the guide strip (90, 90') with the sensor (95) is arranged to protrude relative to any guide strips without a sensor laterally in direction towards the guide surface (82, 82') of the rollers (74).

11. An escalator (10) or moving walkway (50) according to claim 1, wherein a signal issued by the sensor (95) is used for generating maintenance reports.

12. A guide strip (90, 90') for an escalator (10) or moving walkway (50) according to claim 1 for lateral guidance of rollers (74) of a step belt (18) or plate belt (58), wherein the guide strip (90, 90') has a guide flank (97) with a flank angle ($\alpha$), characterized in that the guide strip (90, 90') is constructed as a separate component and has fastening means (93) for fastening to a guide rail (56A, 56B), the guide flank having, in at least one end region of the guide strip (90, 90') in a movement direction (R), a convex curvature and/or an entry angle ($\beta$) between 1° and 45°.

13. A guide strip (90, 90') according to claim 12, wherein the convex curvature and/or entry angle ($\beta$) is between 5° and 35°.

14. The guide strip (90, 90') according to claim 13, wherein the convex curvature and/or entry angle is between 5° and 35°.

15. The guide strip (90, 90') according to claim 13, wherein the convex curvature and/or entry angle is between 10° and 25°.

16. A guide strip (90, 90') according to claim 12, wherein a sensor (95) for scanning and/or measuring lateral forces (F) acting on the guide flank (97) is arranged at the guide strip (90, 90').

17. A guide strip (90, 90') according to claim 16, wherein the sensor (95) is arranged in a region between two fastening means (23).

18. The guide strip (90, 90') according to claim 17, wherein the sensor (95) is arranged centrally between the two fastening means (23).

19. A guide strip (90, 90') according to claim 12, wherein the guide strip comprises at least one sensor for detecting or measuring at least one of the measurement variables of solid-borne sound, vibration, the lining thickness of rollers, the thickness of dirt adhering to the guide track and/or the rollers or the position of a ball-bearing ring of a roller relative to the roller axis thereof.

* * * * *